(12) United States Patent
Rupprecht et al.

(10) Patent No.: US 6,430,241 B1
(45) Date of Patent: Aug. 6, 2002

(54) METHOD AND CONFIGURATION FOR SYNCHRONIZING SYSTEM UNITS

(75) Inventors: Johannes Rupprecht, München (DE); Marcel-Bruno Manzardo, Palo Alto, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/376,945

(22) Filed: Aug. 18, 1999

(51) Int. Cl.⁷ .................................................. H04L 7/00
(52) U.S. Cl. ....................... 375/358; 370/519; 455/424; 455/67.4; 455/67.6
(58) Field of Search ................................ 375/221, 358; 370/508, 519, 249; 455/24, 67.4, 67.6, 70, 115, 424

(56) References Cited

U.S. PATENT DOCUMENTS 5,379,299 A * 1/1995 Schwartz .................... 370/519
5,793,772 A * 8/1998 Burke et al. ................. 370/508

* cited by examiner

*Primary Examiner*—Amanda T. Le
(74) *Attorney, Agent, or Firm*—Laurence A. Greenberg; Werner H. Stemer; Gregory L. Mayback

(57) ABSTRACT

The configuration and the method coordinate the operating clock signals of different communications devices with one another. The devices may thereby be connected to one another via a synchronous or an asynchronously transmitting network. First, a propagation delay of a signal between two communications devices is determined. There is additionally determined the conversion outlay within the processing devices for the identification of the respective timing signal. The compensation is effected as a function of the signal conditioning time and the propagation delay on the network. In particular, this enables the operating clock signals of base stations located at remote switching devices to be coordinated with one another in the correct phase, if the base stations are connected to one another for example via a local area network, such as a high-speed Ethernet.

12 Claims, 2 Drawing Sheets

METHOD AND CONFIGURATION FOR SYNCHRONIZING SYSTEM UNITS

BACKGROUND OF THE INVENTION

Field of the Invention

The invention relates to a method for the synchronization of system units which are connected to one another via an, in particular, asynchronously transmitting connection, specifically of telecommunications devices which have to be supplied with synchronous operating clock signals and are connected to one another via a high-speed LAN (Local Area Network).

Telecommunications devices are usually interconnected with the aid of synchronous networks. The clock supply of remote units is thereby effected by means of various clock generators operating as slave, and a master clock generator, which synchronizes these remote units with the aid of synchronization pulses sent to the slave clock generators. The time duration between two synchronization pulses is bridged with phase control loops which keep the clock signal in the slave clock generators constant. Particularly in the case of digital data transmission, the exact synchronization of all the system units is important in order that no data bits can be lost. However, as the propagation delay of the synchronization pulse increases, which may be caused for example by long line lengths between the master and slave clock generators, the phase angle of the slave clock signal is shifted with respect to the master clock signal as a function of the time duration required by the synchronization pulse on its way from the master clock generator to the slave clock generator. Problems arise when the propagation delay causes a phase deviation of the slave clock signal relative to the master clock signal which is greater than the permissible phase deviation for a respective communications application. Problems can arise, therefore, at very high clock rates, and/or in the case of very small permissible phase deviations.

However, there are telecommunications devices commercially available which impose very stringent requirements on the timing and phase accuracy of the operating clock signal in the entire communications system. Particularly high requirements are imposed on the quality of the clock supply in this respect by digital wireless communications links, such as, by way of example, those according to the DECT standard (DECT=Digital Enhanced Cordless Telephone) and according to the GSM standard (GSM= Global System for Mobile Communication). In those cases, call connections of base stations which serve different communications cells have to be handed over to one another if a communications subscriber moves into an adjacent communications cell in the course of an existing connection, without any impairment of the connection quality being allowed in the process.

SUMMARY OF THE INVENTION

It is accordingly an object of the invention to provide a method and a configuration for synchronizing two or more system units, which overcomes the above disadvantages of the heretofore-known devices and methods of this general type, that is, a method and a configuration by means of which the operating clock signals of system units which are connected to one another in particular via an asynchronously transmitting connection can be synchronized by means of this connection.

With the foregoing and other objects in view there is provided, in accordance with the invention, a method of compensating a phase angle of an operating clock signal for first and second system units connected via a time-delaying transmission connection, the method which comprises:

transmitting a test signal with a first system unit via a connection to a second system unit, receiving the test signal with the second system unit, looping the test signal through and returning the test signal to the first system unit, and measuring, with the first system unit, a loop propagation delay representing a time duration elapsed between a sending and an arrival of the test signal;

determining with the second system device an internal delay time representing a processing duration required for processing a signal arriving via the connection; and compensating the phase angle of an operating clock signal of the first and second system units with the loop propagation delay and the internal delay time.

The method according to the invention provides not merely for measuring the propagation delay of a signal between the adjacent system units, which are connected to one another in particular via an asynchronous network, but likewise for taking account of the processing duration required by a unit for the conversion of a data frame arriving on the asynchronous connection. This advantageously ensures that account is taken of the essential time-relevant operations during the communication of the system units via the connection network, that is to say the propagation delay and the processing duration for the conversion of a communications protocol. The invention is advantageously applied both to asynchronous connections and to synchronously transmitting connections in which the propagation delay of a synchronization pulse shifts the phase angle of the operating clock signals with respect to one another beyond a permissible extent.

The requisite measurements and evaluations and also the necessary adaptations can in this case be implemented with any desired work division and technically practical combination of individual or a number of units. By way of example, the role of the master and slave units during the measurement, looping and clock matching can be interchanged as desired.

In accordance with an added feature of the invention, a permissible phase deviation of the phase angle is defined and the phase angle is compensated using the permissible phase deviation. In other words, in the course of the compensation of the phase angle it is not merely the loop propagation delay and the internal delay time that are taken into account, rather a permissible phase deviation is also included. In this way, clock fluctuations of the phase-locked loop are to an extent permissible and a synchronization pulse to be transmitted may not need to be sent as often. The clock fluctuations may even be of a statistical nature in the framework of the sampling theorem.

In accordance with an additional feature of the invention, an information item concerning an internal delay time is communicated from the second system unit, and the phase angle is compensated with the first system unit. In other words, one unit, for example the slave unit, communicates its internal delay time to the other unit, for example the master unit, and the latter corrects its clock signal, for example the master clock signal, as a function of this delay time and of the loop propagation delay. The master clock unit generally has higher computing capacities and can perform a correction more easily. In addition, the method is practicable for a plurality of system units which are connected to one another and are all connected to the same network, if it can be assumed that the transmission durations of the signals to the different units within the network are approximately constant and only the communication between two such units has to take place in order to coordinate all the operating clock signals of the communications devices present in the system with one another.

In accordance with an alternative feature of the invention, the method comprises a step of communicating from the first system unit an information item concerning the loop propagation delay to the second system unit, and wherein the compensating step comprises compensating the phase angle with the second system unit. That is, the measurement of the loop propagation delay by the slave unit can take place if the master unit loops through the connection in order to determine the delay by the master unit (P1→P0→P1 in FIG. 2). This advantageously enables slave units to adapt their clock signal and their phase angle automatically.

In accordance with another feature of the invention, a synchronization information item for synchronizing the operating clock signal is sent between the first and second system units, and the phase angle of the synchronization information item is compensated.

The further variant of the method described provides for remote communications devices to be supplied with the loop propagation delay by the master system and to adapt the phase angle of their system clock signals correspondingly. This advantageously ensures that, in a system interconnection comprising many communications devices, the system clock signals thereof can be corrected in terms of their phase even if very large individual loop propagation delay differences occur between them and the master system.

Advantageously, for the purpose of synchronization, a synchronization pulse is sent since the clock signals of phase-locked loops can be synchronized in a known manner using this pulse.

In accordance with a further feature of the invention, communication is effected via the connection according to a defined communications protocol, and an outlay for protocol conversion is registered in the course of determining the internal delay time. In other words, in the course of determining the internal delay time of a communications unit, account is likewise taken of the time required to convert a specific, currently used communications protocol in accordance with which communication is effected via the connection which effects transmission in a time-delaying manner. This procedure allows the timing of the various system units to be matched to one another even more accurately.

In accordance with again an added feature of the invention, the synchronizing method is repeated at periodic time intervals. This makes it possible to construct simpler phase-locked loops whose accuracy requirement with respect to the clock signal generation can decrease with the method frequency, in other words as the period decreases.

In accordance with a preferred embodiment of the invention, a development of the method described provides for the connection which effects transmission in a time-delaying manner to operate asynchronously, because in practice many networks, in particular local area networks, transmit according to this principle but are subject to statistics which mean that average propagation delays occur for signal transmissions, which is why this variant of the method described can be applied in a particularly advantageous manner in practice.

With the above and other objects in view there is also provided, in accordance with the invention, a configuration for compensating a phase angle of an operating clock signal for first and second system units connected via a time-delaying transmission connection, comprising:

a first system unit, a second system unit, and a time-delaying transmission connection connecting said first system unit to said second system unit;

a first device for outputting a test signal via said connection in one of said system units;

a second device for looping through the connection between said first system unit and said second system unit;

a third device for determining a loop propagation delay representing a propagation delay of the test signal via said looped-through connection;

a fourth device for determining an internal delay time representing a duration of processing of a signal, sent via the connection, by one of said system units; and a fifth device for compensating a phase angle of the operating clock signal of a system unit as a function of the loop propagation delay and the internal delay time.

In other words, the configuration for the compensation of the phase angle of an operating clock signal in the case of a first and second system unit is one in which the connection between the two system units is looped through, because in this way the propagation delay of a test signal between the two system units can be determined in a very simple manner and it is entirely irrelevant whether these two system units are connected to one another by a synchronous or an asynchronous connection. In combinations with means for determining the internal delay time for the processing of a signal in the case of the second system unit, this affords a technically simple configuration for the synchronization of the phase angle of operating clock signals of communications devices which are connected to one another by connections which effect transmission in a time-delaying manner.

In accordance with again another feature of the invention, at least one clock generator is provided in a respective system unit for generating the operating clock signal; also, a device for sending and/or receiving a synchronization pulse via the connection and a phase-locked loop for compensating the phase angle are provided. Clock generators are thus present in the different system units and are coordinated with one another merely by means of a synchronization pulse, because in this way only a minimum of control signals in the form of synchronization pulses need be transmitted via the connection and the remainder of the transmission capacity of the connection is available for useful signals or other signaling information.

Instead of the synchronization pulse, it is also possible to use a different form of transmission of the synchronization information in the form of a time stamp.

In accordance with an advantageous development of the invention, base stations for wireless communications links are connected to the respective system units, because the arrangement described makes it possible to obtain a clock quality and phase quality which are particularly suitable for the setting up of wireless communications links, in particular for the transferring of existing connections between adjacent base stations which are indirectly or directly connected to one another via time-delaying communications links.

In accordance with a concomitant feature of the invention, an asynchronous transmitting connection is provided as the connection between the system units, because in practice communications links are frequently set up via local area networks (LANs). Typically, LANs operate asynchronously, and the configuration described is particularly suitable for use in combination with asynchronous connections as well, because the cause and nature of the delay are not important for their function.

Other features which are considered as characteristic for the invention are set forth in the appended claims.

Although the invention is illustrated and described herein as embodied in a method and arrangement for the synchronization of system units, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
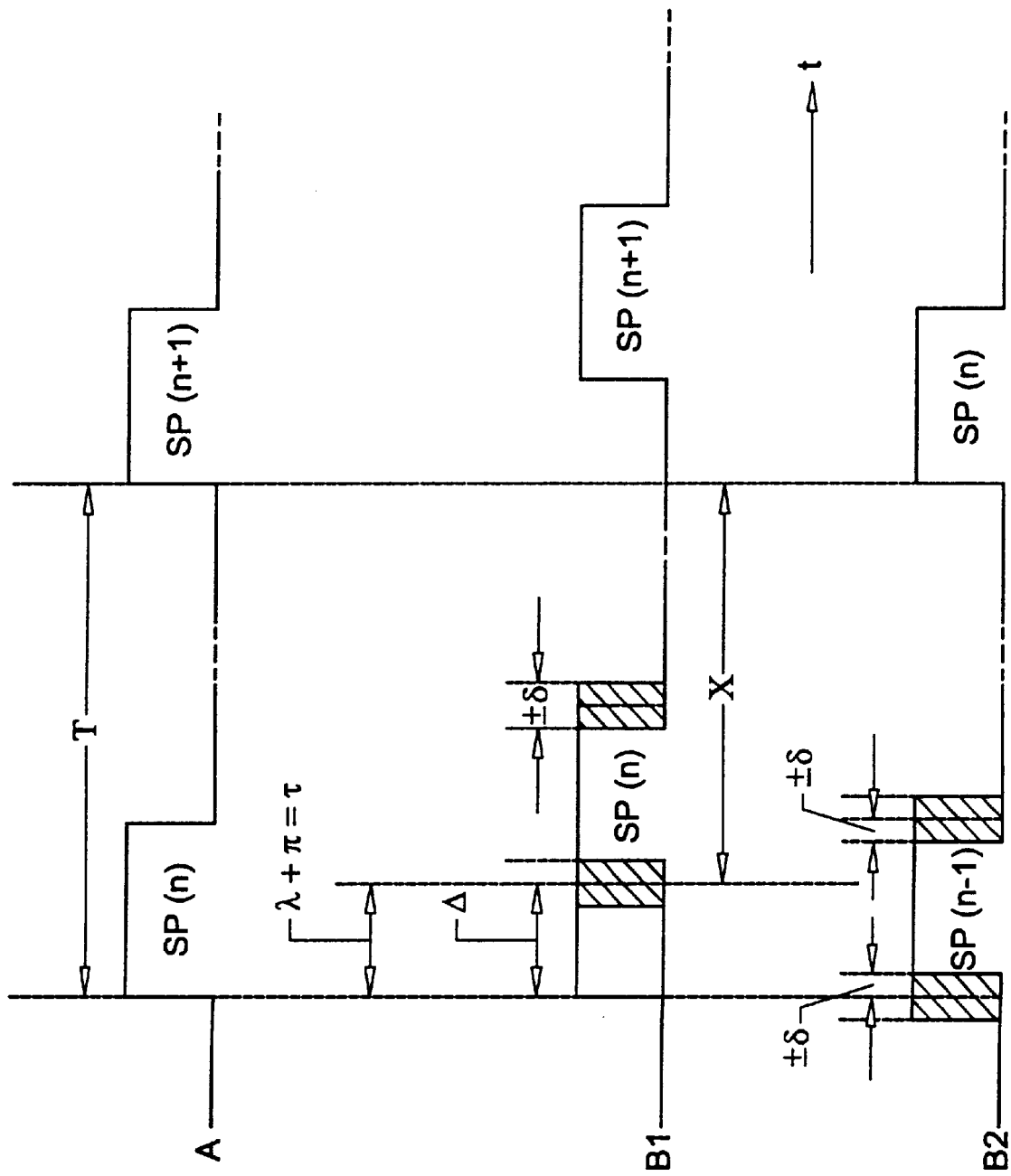
FIG. 1 is a diagrammatic time chart showing a time sequence in the course of the clock synchronization of two system units.

Referring now to the figures of the drawing in detail and first, particularly, to FIG. 1 thereof, the time sequence diagram illustrates the problems which arise in the course of the synchronization of system units which are connected to one another via a network that effects transmission in a time-delaying manner, and the operating clock signals of which system units are nonetheless intended to be effected synchronously. The problem arises to a particularly high degree when the distance between the system units is particularly great, when the clock rate is very high, or when the permitted phase deviation of the operating clock signals from one another is very small.

Three system units A, B1 and B2 are shown here. In one exemplary embodiment, the system A may function as master clock generator, while the systems B1 and B2, as slave clock generators, synchronize their operating clock signals as a function of the operating clock signal prescribed by A. It is a precondition here that the phase shift between these operating clock signals must not exceed or fall below a specific prescribed magnitude. The clock supply of the respective system units can be effected for example by phase-locked loops in conjunction with a clock generator provided separately for each system unit.

For the synchronization of the other system units, the system unit A sends only one synchronization information item, for example in the form of a synchronization pulse SP(n), which is output repeatedly, for example periodically, by A. The period of the synchronization pulse is designated by T. The time axis is plotted toward the right in FIG. 1. Both the n−1$^{th}$, the n$^{th}$ synchronization pulse SP(n−1), SP(n), and the N+1 synchronization pulse SP(n+1) are illustrated.

The synchronization pulse SP(n) output by A arrives at B1 with a time delay of magnitude τ. The time delay is caused by the propagation delay λ of the signal on the connection between A and B1 and the internal delay time π required by B1 in order to condition and identify the synchronization information of the system A.

When messages and control information items are sent via asynchronous networks, such as, for example, GBit Ethernets, communications protocols which are structured according to the OSI layer model are frequently used. In this case, the HDLC protocol (HDLC=High Level Data Link Control) is frequently used for coding the signaling information. Speech is frequently conditioned according to the PCM method (PCM=Pulse Code Modulation).

In this case, the outlay for decoding the information rises with the number of protocol layers that have to be converted before the required information items are obtained. The synchronization pulse, for example, can be transmitted via layer 3, the network layer of the OSI layer model. However, delayed signal propagation times occur not only in the case of asynchronously transmitting connections by also in the case of synchronous connections, if the transmission path is particularly long. The permitted phase deviation is ±δ in this case and is illustrated as a gray hatched region. With the positive and negative permitted phase shift being taken into account, the instantaneous phase shift turns out to be Δ. In order to supply the system unit B1 with an operating clock signal in the correct phase with regard to the system unit A, it is necessary, therefore, to shift the synchronization pulse for B by Δ in the negative time direction or by a compensation delay X in the positive time direction.

As the example of the system unit B2 shows, this procedure leads to a correct phase angle. These facts are shown at B2 with the use of synchronization pulses SP(n−1) and SP(n), where n−1, n and n+1 denote successive clock periods.

In accordance with the method described, the phase adjustment of the synchronization pulse SP is achieved by virtue of the fact that in the system unit A, for example, the delay time of a signal proceeding therefrom is measured on the forward and return path from A to B1. This corresponds to 2λ, because the signal in this case covers twice the distance from A to B. In addition, the delay time τ required by B2 in order to identify and, if appropriate, pass on the synchronization pulse must also be taken into account for the calculation of the correct signal delay. The compensation delay X is added in such a way that the propagation delay λ added to the delay time τ and the compensation delay X is equal to a multiple of the period of the synchronization pulses. This relationship is represented in the following equation:

$$\lambda + \pi + X = n*T.$$

If B2 itself does not utilize the synchronization pulse but rather is intended to supply further slave clock generators with these synchronization pulses, it is necessary to provide a very accurate phase-locked loop (PLL) in B.

Figure 2:
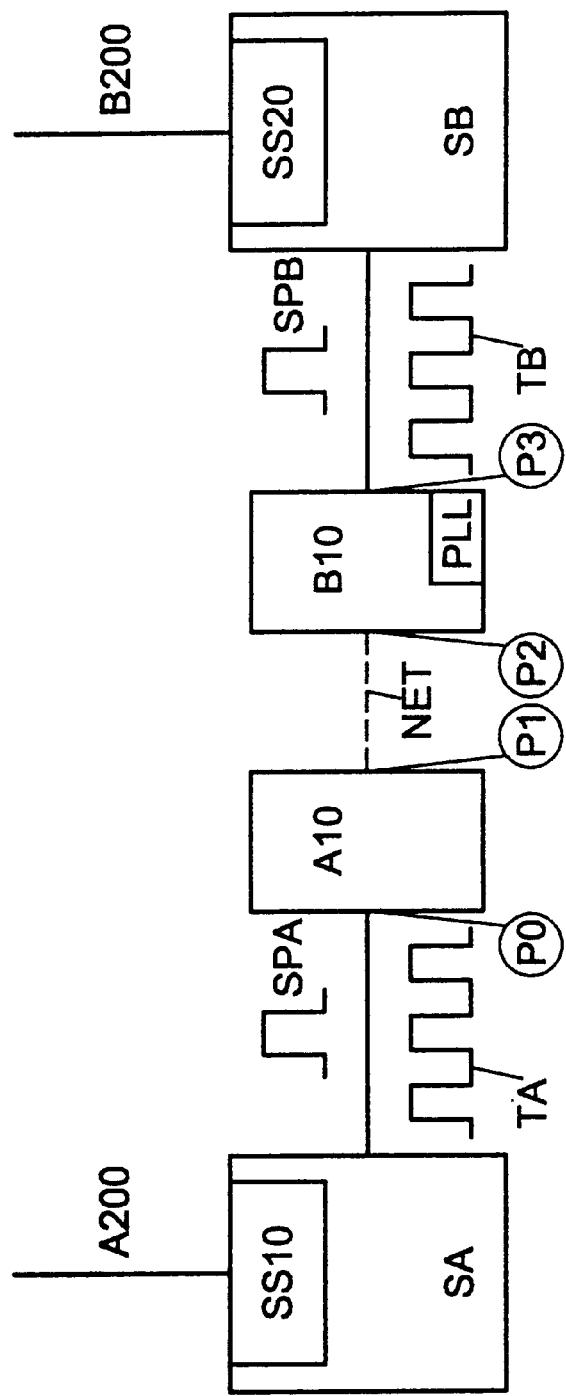
FIG. 2 is a schematic block diagram showing two system units which are interconnected by means of a network which effects transmission in a time-delaying manner.

FIG. 2 presents a diagrammatic illustration of communications devices which are connected to one another via a network which effects transmission in a time-delaying manner. In this case, by way of example, a telecommunications device SA and a telecommunications device SB are connected to one another via an asynchronous network NET. The connection is realized for example directly or via interface devices A10 and B10. In a variant of described communications devices for the provision of a direct connection, the interface devices may be integrated in the telecommunications devices and be accommodated in the same housing. Interchange points P0, P1, P2 and P3 are marked at the interfaces. The communications device may be, by way of example, a switching system which serves a base station of a wireless communications network via an interface SS10 and a line A200. The communications device SB, for example, may likewise be a switching device, or else a peripheral of the switching device SA. SB may, for example, likewise control a base station of a wireless communications network via an interface SS20 and a line B200. The base stations may thereby serve adjacent cells of a private or locally bounded wireless communications network.

Known wireless communications networks are, in particular, cellular communications networks according to the GSM or DECT standard. In the case of these digitally transmitting radio networks, users of wireless peripherals can move in different cells each served by mutually different base stations of the system. This is referred to as roaming. In the roaming context, it is important that an existing communications link be passed on from one base station to a next base station in a manner not noticed by the user and without data losses. This operation is also referred to as "handoff" in the applicable technical jargon. For this purpose, certain time conditions have to be fulfilled by the interfaces SS10 and SS20. In particular, a prescribed permitted phase shift of the clock signal, and/or of a prescribed synchronization pulse, must not be exceeded.

In the example illustrated here, the switching device SA supplies its peripherals by means of an operating clock signal TA and synchronizes peripheral clock generators by means of a synchronization pulse SP. Therefore, by way of example, SA in this case constitutes the master clock generator for further devices in the network interconnection of this switching device. By way of example, SB shall be supplied with this operating clock signal via the network NET which effects transmission in a time-delaying manner.

The synchronization information in the form of the synchronization pulse SPB and the operating clock signal TB of the peripheral device SB are illustrated. Only the prescribed permitted phase shift, which was designated by ±δ in FIG. 1, is permissible between SPA and SPB, or respectively TA and TB. If this condition is not met, data losses occur when a base station which is connected via A200 passes on a call to a base station which is connected to B200. In accordance with the method described, therefore, first of all the propagation delay of a signal from P0 to P1, P1 to P2 and back again, or from P0 to P3 and back again, is measured. For this purpose, the communications link is looped through from P0 up to the respective endpoint. The signal propagation delay to be determined should in this case be registered with a measurement accuracy considerably greater than that of the permissible allowed phase shift, for example with 1/10 of the allowed phase shift.

In a further step of the method described, the processing duration for identifying the signal sent via NET is determined. The outlay arises from the unpacking of the useful information from the protocol layers. This can be done for example during a start procedure of the interface device B10 in that the latter reads in and conditions a corresponding protocol section and data frame stored for this purpose and measures the time duration required for this.

For the compensation of the phase shift, A10 and B10 can then communicate reciprocally the characteristic times previously measured. In a preferable manner, the interface device A10 will pass the propagation delay determined on to the interface device B10 and the latter will correct its synchronization pulse correspondingly, as already illustrated in FIG. 1 as well, in terms of the phase. This leads to isochronous system clock signals TA and TB of the communications devices SA and SB. A phase-locked loop PLL is responsible in this case for the clock generation in B10.

The invention provides a simple method and a configuration that can be realized in a technically simple manner, by means of which, by way of example, locally bounded cellular radio networks can be operated, the individual base stations for the respective cells of the network being connected to one another by a local computer network operating asynchronously.

We claim:

1. A method of compensating a phase angle of an operating clock signal for first and second system units connected via a time-delaying transmission connection, the method which comprises:

transmitting a test signal with a first system unit via a connection to a second system unit, receiving the test signal with the second system unit, looping the test signal through and returning the test signal to the first system unit, and measuring, with the first system unit, a loop propagation delay representing a time duration elapsed between a sending and an arrival of the test signal;

determining with the second system device an internal delay time representing a processing duration required for processing a signal arriving via the connection; and compensating the phase angle of an operating clock signal of the first and second system units with the loop propagation delay and the internal delay time.

2. The method according to claim 1, which comprises defining a permissible phase deviation of the phase angle and compensating the phase angle using the permissible phase deviation.

3. The method according to claim 1, which comprises communicating from the second system unit an information item concerning an internal delay time thereof to the first system unit, and wherein the compensating step comprises compensating the phase angle with the first system unit.

4. The method according to claim 1, which comprises communicating from the first system unit an information item concerning the loop propagation delay to the second system unit, and wherein the compensating step comprises compensating the phase angle with the second system unit.

5. The method according to claim 1, which comprises sending a synchronization information item for synchronizing the operating clock signal between the first and second system units, and compensating a phase angle of the synchronization information item.

6. The method according to claim 1, which comprises communicating via the connection according to a defined communications protocol, and registering an outlay for protocol conversion in the course of determining the internal delay time.

7. The method according to claim 1, which comprises repeating the method steps at periodic time intervals.

8. The method according to claim 1, which comprises transmitting with the connection in asynchronous transmission.

9. A configuration for compensating a phase angle of an operating clock signal for first and second system units connected via a time-delaying transmission connection, comprising:

a first system unit, a second system unit, and a time-delaying transmission connection connecting said first system unit to said second system unit;

a first device for outputting a test signal via said connection in one of said system units;

a second device for looping through the connection between said first system unit and said second system unit;

a third device for determining a loop propagation delay representing a propagation delay of the test signal via said looped-through connection;

a fourth device for determining an internal delay time representing a duration of processing of a signal, sent via the connection, by one of said system units; and a fifth device for compensating a phase angle of the operating clock signal of a system unit as a function of the loop propagation delay and the internal delay time.

10. The configuration according to claim 9, which further comprises:

at least one clock generator in a respective said system unit for generating the operating clock signal;

a device for sending and/or receiving a synchronization pulse via said connection; and a phase-locked loop for compensating the phase angle.

11. The configuration according to claim 9, wherein said first system unit is a switching device for a communications link selected from the group of line-free, line-based, and mixed line-free and line-based communications links, and includes a first base station; and wherein said second system unit includes a base station of a line-free communications network; and said connection is a high-speed network providing wireless service.

12. The configuration according to claim 9, wherein said connection is an asynchronous connection effecting transmission in a time-delaying manner.

* * * * *